US009705672B2

(12) United States Patent
Su et al.

(10) Patent No.: US 9,705,672 B2
(45) Date of Patent: Jul. 11, 2017

(54) KEY MANAGEMENT METHOD AND SYSTEM

(71) Applicant: Fujian LANDI Commercial Equipment Co., Ltd., Fujian (CN)

(72) Inventors: Wenlong Su, Fujian (CN); Luqiang Meng, Fujian (CN); Chengyong Yao, Fujian (CN); Ruibing Chen, Fujian (CN)

(73) Assignee: FUJIAN LANDI COMMERCIAL EQUIPMENT CO., LTD., Fujian (CN)

( * ) Notice: Subject to any disclaimer, the term of this patent is extended or adjusted under 35 U.S.C. 154(b) by 122 days.

(21) Appl. No.: 14/775,633

(22) PCT Filed: Jan. 23, 2014

(86) PCT No.: PCT/CN2014/071231
§ 371 (c)(1),
(2) Date: Sep. 11, 2015

(87) PCT Pub. No.: WO2014/139341
PCT Pub. Date: Sep. 18, 2014

(65) Prior Publication Data
US 2016/0028539 A1 Jan. 28, 2016

(30) Foreign Application Priority Data
Mar. 15, 2013 (CN) .......................... 2013 1 0084653

(51) Int. Cl.
*G06F 21/00* (2013.01)
*H04L 9/08* (2006.01)
(Continued)

(52) U.S. Cl.
CPC .......... *H04L 9/0825* (2013.01); *H04L 9/0836* (2013.01); *H04L 9/0861* (2013.01);
(Continued)

(58) Field of Classification Search
CPC ..................................... H04L 9/0825
See application file for complete search history.

(56) References Cited

U.S. PATENT DOCUMENTS

| 8,117,125 | B1 | 2/2012 | Kawan et al. | ................... 705/40 |
| 2003/0126457 | A1* | 7/2003 | Kohiyama | .............. G06F 21/33 |
| | | | | 713/193 |

(Continued)

FOREIGN PATENT DOCUMENTS

| CN | 101656007 A | 2/2010 |
| CN | 101930644 A | 12/2010 |

(Continued)

OTHER PUBLICATIONS

International Search Report dated May 12, 2014, issued to International Application No. PCT/CN2014/071231.

*Primary Examiner* — Morshed Mehedi
(74) *Attorney, Agent, or Firm* — Stein IP, LLC (57) ABSTRACT

Disclosed are a key management method and system. A master key is remotely downloaded to avoid the problem that the master key is not issued to a merchant until the master key needs be downloaded on a POS terminal, so as to reduce logistics costs and maintenance costs. When a key is remotely downloaded, a KMS system uses a symmetric algorithm to encrypt the key to be transmitted to ensure that the encrypted key can only be decrypted by a corresponding POS terminal, thereby ensuring the security of data transmission. During bidirectional authentication, an application program of the POS terminal can only contact an encrypted text form of the key instead of a plain text key needing to be remotely downloaded to the POS terminal, thereby ensuring security in reproduction.

10 Claims, 2 Drawing Sheets

(51) Int. Cl.
  *H04L 29/06* (2006.01)
  *H04L 9/32* (2006.01)
(52) U.S. Cl.
  CPC .............. *H04L 9/0869* (2013.01); *H04L 9/32* (2013.01); *H04L 9/3247* (2013.01); *H04L 9/3265* (2013.01); *H04L 63/062* (2013.01); *H04L 2209/56* (2013.01)

(56) References Cited

U.S. PATENT DOCUMENTS

| | | | | |
|---|---|---|---|---|
| 2005/0010767 | A1* | 1/2005 | Craft | G06F 21/123 |
| | | | | 713/168 |
| 2007/0106894 | A1* | 5/2007 | Zhang | H04L 9/32 |
| | | | | 713/170 |
| 2007/0223705 | A1* | 9/2007 | Kasahara | G06F 21/10 |
| | | | | 380/281 |
| 2009/0287921 | A1* | 11/2009 | Zhu | G06Q 10/02 |
| | | | | 713/155 |
| 2013/0145477 | A1* | 6/2013 | Matsushima | G06F 21/10 |
| | | | | 726/26 |

FOREIGN PATENT DOCUMENTS

| | | |
|---|---|---|
| CN | 103237005 A | 8/2013 |
| EP | 1 833 009 A1 | 9/2007 |
| KR | 10-2007-0011937 A | 1/2007 |

\* cited by examiner

KEY MANAGEMENT METHOD AND SYSTEM

CROSS-REFERENCE TO RELATED APPLICATIONS

This application is a national stage of International Application No. PCT/CN2014/071231, filed Jan. 23, 2014, which claims the benefit of priority to Chinese Application No. 201310084653.8, filed Mar. 15, 2013, in the State Intellectual Property Office, the disclosures of which are incorporated herein by reference.

TECHNICAL FIELD

The present invention relates to the field of electronic payment, in particular to a key management method and a key management system for a device.

DESCRIPTION OF THE RELATED ART

Bank cards as a payment tool have become more and more popular. Usually, a bank card payment system includes a POS terminal (Point of Sales), a POSP (POS Payment) system, a PIN PAD, and a HSM (Hardware and Security Module). Wherein, the POS terminal is a device which can receive the bank card information, has a communication function, and receives the teller's order to complete the financial transaction information and the related information exchange; the POSP system is a system of centralized management and traction handling that performs centralized management on the POS terminal, including parameter downloading, key downloading, receiving, handling or transferring of transaction requests of the POS terminal, and feeds back the trading result information to the POS terminal; the PIN PAD is a security device for securely storing and protecting various keys related to the financial transactions, and encrypting the PIN for protection; the hardware and security module (HSM) is a peripheral hardware device for encrypting the transmitted data, used to encrypt and decrypt the PIN, verify the correctiveness of the messages, and documents and store keys. A PIN (Personal, Identification Number), namely a personal PIN, is data information for identifying the validity of the identity of the card holder in on-line transactions, which is not allowed to be shown as a clear text in any link of the computer and network system; a TMK (Terminal Master Key) is a master key for encrypting the working keys when the POS terminal works, which is encrypted and stored in the database. The POS terminal is widely applied to bank card payment occasions, for example, malls and hotels, and is an indispensable modern payment means which is seen everywhere in daily life. Bank cards, in particular debit cards, are usually set with a PIN by card holders. In the process of payment, the POS terminal uploads the magnetic track information of the bank card and also needs the PIN so that the issuing bank can verify the validity of the identification of the card holder, thus ensuring the payment security of the bank card and protecting the property security of the card holder. To prevent a PIN from being disclosed or being decrypted, it is required that the PIN is encrypted throughout the whole information interaction process from the terminal to the issuing bank. The PIN is not allowed to be shown as a clear text in any link of the computer network system. Therefore, all POS terminals that receive PIN inputs are required to be configured with the key management system.

The key system of the POS terminal is classified into two levels: terminal master key (TMK) and working key (WK). Wherein, the TMK encrypts and protects the WK in the updating process of the MK. Every POS terminal shares an exclusive TMK with the POS and must be provided with security protection to ensure that the TMK can only be written into the device and participate in the calculation and cannot be read; the TMK is a critical root key; if the TMK is intercepted, the working key is easily cracked, which seriously endangers the payment security of the bank card. Whether the TMK can be securely downloaded into the POS terminal is critical to the security of the whole POS terminal. The following are existing TMK downloading methods:

1. Key parent POS solution: The user enters the same transmission encryption key to the POSP, HSM, and key parent POS. The POS terminal sends a TMK downloading request to the POSP system through the key parent POS; the POSP system drives the HSM to randomly generate the TMK, encrypts the TMK by using the transmission encryption key, and transmits the encrypted TMK to the key parent POS; the key parent POS decrypts the TMK by using the transmission encryption key and then transmits the decrypted TMK to the POS terminal; the POS terminal obtains the clear text of the TMK and saves the clear text into the PIN PAD of the POS terminal, thus realizing the synchronization of the TMKs between the POS terminal and the POSP system.

2. IC card decryption solution: The user enters the same transmission encryption key to the POSP, HSM, and IC card. The user inserts the IC card into the POS terminal; the POS terminal sends a TMK downloading request to the POSP system through the POS terminal; the POSP system drives the HSM to randomly generate the TMK, encrypts the TMK by using the transmission encryption key and transmits the encrypted TMK to the POS terminal; the POS terminal decrypts the cipher text of the TMK by using the transmission encryption key in the IC card to obtain the clear text of the TMK, and saves the clear text in the PIN PAD of the POS terminal, thus realizing the synchronization of the TMKs between the POS terminal and the POSP system.

Both of the above solutions have the following defects: the clear text of the TMK is out of the security device, and in order to prevent the keys from leaking, the downloading of the TMK must be controlled in the security machine room of the management center and manually downloaded in a concentrated way. Therefore, problems of large workload in the machine room of the maintenance center, rise of the transmission cost because the device is required to be transported to the security machine room of the management center to download the keys, and only then can the keys be distributed to the merchants; huge demands on labor and working time to download the keys in a concentrated way, high maintenance cost and long maintenance cycle are caused.

At present, a remote key downloading solution is provided: the POSP system calls the HSM to generate a pair of public and private keys; the POS terminal calls the PIN PAD to randomly generate the TMK, encrypts the TMK by using the public key of the POSP system and transmits the encrypted TMK to the TMS; the TMS calls the HSM, decrypts the TMK by using the private key, stores the decrypted TMK, encrypts the working key by using the TMK and then downloads it to the POS terminal. This solution has the following defects: the POSP system cannot identify the identification of the POS terminal and prevent a fake terminal from connecting to the POSP system to download the TMK; the POS terminal cannot identify the identification of the POSP system and prevent a fake POSP system from downloading the fake TMK.

Contents of the Present Invention

To solve the above mentioned problems, the present invention adopts the following technical solutions:

A key management method is provided, comprising the following steps of: calling the first hardware and security module to generate a public key Pu and a private key Pr, storing the private key Pr in the first hardware and security module and sending the public key Pu to the security module of the POS terminal, by an MTMS system; calling the first hardware and security module by the MTMS system and calling the second hardware and security module by a KMS system to respectively combine MTMS access components and KMS access components into a protective key PK and a MAC key MAK in the respective hardware and security module and store the protective key PK and the MAC key MAK in the first hardware and security module and the second hardware and security module; controlling the POS terminal by an operating system to generate a transmission key TK and store the transmission key in the security module of the POS terminal, wherein the transmission key TK consists of a transmission encryption key TEK and an authentication key AUK; encrypting the transmission key TK by using the public key Pu to generate the first transmission key cipher text Ctk_Pu in the security module, via the POS terminal; sending the first transmission key cipher text Ctk_Pu and the terminal sequence number SN to the MTMS system through the operating terminal via the POS terminal; storing the received terminal sequence number SN and the first transmission key cipher text Ctk_Pu connectedly in the SN-Key_MTMS database, via the MTMS system; calling the first hardware and security module to decrypt the first transmission key cipher text Ctk_Pu by using the private key Pr so as to obtain the transmission key TK, then encrypt the transmission key TK by using the protective key PK and calculate the MAC value by using the MAC key MAK so as to generate a second transmission key cipher text Ctk_Pk, via the MTMS system; sending the terminal sequence number SN and the second transmission key cipher text Ctk_Pk to the KMS system by the MTMS system; connectedly storing the terminal sequence number SN and the second transmission key cipher text Ctk_Pk sent from the MTMS system in the SN-TK_KMS database by the KMS system; sending the terminal sequence number SN and a downloading master key application to the KMS system by the POS terminal; inquiring about the second transmission key cipher text Ctk_Pk corresponding to the terminal sequence number SN by the KMS system after receiving the terminal sequence number and the downloading master key application sent by the POS terminal; calling the second hardware and security module to verify the MAC validity of the inquired-about second transmission key cipher text Ctk_Pk by using the MAC key MAK, and if the verification is passed, decrypting the second transmission key cipher text Ctk_Pk by using the protective key PK to obtain the transmission key TK, and storing the transmission key in the second hardware and security module, via the KMS system; calling the second hardware and security module to perform bidirectional authentication by using the authentication key AUK and the POS terminal, via the KMS system after obtaining the transmission key TK, and if the authentication is passed, calling the second hardware and security module to encrypt the terminal master key TMK by using the transmission decryption key TEK so as to generate the master key cipher text Ctmk and send the master key cipher text to the POS terminal via the KMS system after obtaining the transmission key TK; decrypting the master key cipher text Ctmk by using the transmission encryption key TEK to obtain the terminal master key TMK and storing the TMK in the security module, by the POS terminal after receiving the master key cipher text Ctmk sent by the KSM system.

Wherein, the step of "calling the first hardware and security module to generate the public key Pu and the private key Pr, storing the private key Pr in the first hardware and security module and sending the public key Pu to the security module of the POS terminal, by the MTMS" includes: calling the first hardware and security module to generate the public key Pu and the private key Pr, storing the private key Pr in the first hardware and security module, recording the index number of the private key Pr in the first hardware and security key, and sending the public key Pu to a CA center, by the MTMS system; obtaining a generated working certificate HsmWCRT from the CA center and storing the working certificate in the database, via the MTMS system, wherein the working certificate HsmWCRT is generated by signing the public key Pu by using a root certificate HsmRCRT; obtaining the working certificate HsmWCRT from the database and sending the working certificate HsmWCRT to the POS terminal via the MTMS system; verifying the validity of the working certificate HsmWCRT with the root certificate HsmRCRT preloaded in a record, via the POS terminal; and after the verification is passed, extracting the public key Pu from the working certificate HsmWCRT and storing the public key Pu in the security module, via the POS terminal.

Wherein, the step of "sending the first transmission key cipher text Ctk_Pu and the terminal sequence number SN to the MTMS system through the operating terminal via the POS terminal, and storing the received terminal sequence number SN and the first transmission key cipher text Ctk_Pu connectedly in the SN-Key_MTMS database, via the MTMS system" includes: sending the first transmission key cipher text Ctk_Pu and the terminal sequence number SN to the operating terminal via the POS terminal; packaging the received first transmission key cipher text Ctk_Pu and the terminal sequence number SN, signing with an operator card, and sending the signed first transmission key cipher text Ctk_Pu and the terminal sequence number SN to the MTMS system via the operating terminal; verifying the validity of the signature, and if the signature is valid, connectedly storing the terminal sequence number SN and the first transmission key cipher text Ctk_Pu in the SN-Key_MTMS database, via the MTMS system.

Wherein, a key management method also comprises the step of: extracting the terminal sequence number SN and the first transmission key cipher text Ctk_Pu to be sent from the SN-Key_MTMS database, verifying the validity of the signature, and if the signature is valid, executing the step of calling the hardware and security module via the MTMS system to decrypt the first transmission key cipher text Ctk_Pu by using the private key Pr so as to obtain the transmission key TK, via the MTMS system.

Wherein, the step of "calling the second hardware and security module to perform bidirectional authentication by using the authentication key AUK and the POS terminal, via the KMS system" includes: generating the first random number Rnd1 and sending the first random number Rnd1 to the KMS system, by the POS terminal; receiving the first random number Rnd1, then generating a second random number Rnd2, calling the second hardware and security module to encrypt the first random number by using the authentication key AUK so as to obtain a first random number text Crnd1, and sending the first random number text Crnd1 and the second random number Rnd2 to the POS terminal via the KMS system; decrypting the received first random number text Crnd1 by using the authentication key AUK so as to obtain a third random number Rnd1', and judging if the third random number Rnd1' is consistent with the first random number Rnd1 or not, via the POS terminal; if the third random number Rnd1' is consistent with the first random number Rnd1, encrypting the second random number Rnd2 by using the authentication key AUK so as to generate a second random number text Crnd2, sending the second random number text Crnd2 to the KMS system via the POS terminal; calling the second hardware and security module to decrypt the received second random number text Crnd2 by using the authentication key AUK so as to obtain a fourth random number Rnd2' and judging if the fourth random number Rnd' is consistent with the second random number Rnd2 or not via the KMS system; and if the fourth random number Rnd' is consistent with the second random number Rnd2, the KMS system and the POS terminal pass the authentication.

Another technical solution adopted by the present invention is as follows:

A key management system is provided, comprising a first hardware and security module, a second hardware and security module, an operating terminal, a POS terminal, an MMS system and a KMS system; the first hardware and security module is used to allow calls by the MTMS system, and the second hardware and security module is used to allow calls by the KMS system; wherein the first hardware and security module is used for calling the first hardware and security module to generate a public key Pu and a private key Pr, storing the private key Pr in the first hardware and security module and sending the public key Pu to the security module of the POS terminal; the MTMS system is used for calling the first hardware and security module and the KMS system is used for calling the second hardware and security module to respectively combine MTMS access components and KMS access components into a protective key PK and a MAC key MAK in the respective hardware and security module, and store the protective key PK and the MAC key MAK in the first hardware and security module and the second hardware and security module; the operating terminal is used for controlling the POS terminal to generate a transmission key TK and store the transmission key in the security module of the POS terminal, wherein the transmission key TK consists of a transmission encryption key TEK and an authentication key AUK; the POS terminal is used for encrypting the transmission key TK by using the public key Pu to generate the first transmission key cipher text Ctk_Pu in the security module, and sending the first transmission key cipher text Ctk_Pu and the terminal sequence number SN to the MTMS system through the operating terminal; the MTMS system is used for storing the received terminal sequence number SN and the first transmission key cipher text Ctk_Pu connectedly in the SN-Key_MTMS database, and calling the first hardware and security module to decrypt the first transmission key cipher text Ctk_Pu by using the private key Pr so as to obtain the transmission key TK, then encrypting the transmission key TK by using the protective key PK, calculating the MAC value by using the MAC key MAK so as to generate a second transmission key cipher text Ctk_Pk, and sending the terminal sequence number SN and the second transmission key cipher text Ctk_Pk to the KMS system; the KMS system is used for connectedly storing the terminal sequence number SN and the second transmission key cipher text Ctk_Pk sent from the MTMS system in the SN-TK_KMS database; the POS terminal is used for sending the terminal sequence number SN and a downloading master key application to the KMS system; the KMS system is used for inquiring about the second transmission key cipher text Ctk_Pk corresponding to the terminal sequence number SN after receiving the terminal sequence number and the downloading master key application sent by the POS terminal; the KMS system is also used for calling the second hardware and security module to verify the MAC validity of the inquired-about second transmission key cipher text Ctk_Pk by using the MAC key MAK, and if the verification is passed, decrypting the second transmission key cipher text Ctk_Pk by using the protective key PK to obtain the transmission key TK, and storing the transmission key in the second hardware and security module; the KMS system is also used for calling the second hardware and security module to perform bidirectional authentication by using the authentication key AUK and the POS terminal after obtaining the transmission key TK, and if the authentication is passed, the KMS system calls the second hardware and security module to encrypt the terminal master key TMK by using the transmission decryption key TEK so as to generate the master key cipher text Ctmk and sending the master key cipher text to the POS terminal; the POS terminal is also used for decrypting the master key cipher text Ctmk by using the transmission encryption key TEK to obtain the terminal master key TMK and storing the terminal master key TMK in the security module after receiving the master key cipher text Ctmk sent by the KSM system.

Wherein, the MTMS system is used for calling the first hardware and security module to generate the public key Pu and the private key Pr, storing the private key Pr in the first hardware and security module, recording the index number of the private key Pr in the first hardware and security module and sending the public key Pu to the CA center; the MTMS system is also used for obtaining the generated working certificate HsmWCRT from the CA center and storing the working certificate in the database; the working certificate HsmWCRT is generated by signing the public key with the root certificate HsmRCRT. The operating system is used for obtaining the working certificate HsmWCRT from the database of the MTMS system, and sending the working certificate HsmWCRT to the POS terminal; the POS terminal is used for verifying the validity of the working certificate HsmWCRT by using the root certificate HsmRCRT preloaded in the record, and used for extracting the public key Pu after the verification is passed and storing the public key Pu in the security module.

Wherein, the POS terminal is used for sending the first transmission key cipher text Ctk_Pu and the terminal sequence number SN to the operating terminal; the operating system is used for packaging the received first transmission key cipher text Ctk_Pu and the terminal sequence number SN, signing with an operator card, and sending the signed first transmission key cipher text Ctk_Pu and the terminal sequence number SN to the MTMS system; the MTMS system is used for verifying the validity of the signature, and if the signature is valid, connectedly storing the terminal sequence number SN and the first transmission key cipher text Ctk_Pu in the SN-Key_MTMS database.

Wherein, the MTMS system is used for extracting the terminal sequence number SN and the first transmission key cipher text Ctk_Pu to be sent from the SN-Key_MTMS database, verifying the validity of the signature, and if the signature is valid, and executing the step of calling the hardware and security module to decrypt the first transmission key cipher text Ctk_Pu by using the private key Pr so as to obtain the transmission key TK.

Wherein, the POS terminal is used for generating the first random number Rnd1 and sending the first random number Rnd1 to the KMS system; the KMS system is used for generating the second random number Rnd2 after receiving the first random number Rnd1, calling the second hardware and security module to encrypt the first random number by using the authentication key AUK so as to obtain the first random number text Crnd1, and sending the first random number text Crnd1 and the second random number Rnd2 to the POS terminal; the POS terminal is used for decrypting the received first random number text Crnd1 by using the authentication key AUK so as to obtain the third random number Rnd1', and judging if the third random number Rnd1' is consistent with the first random number Rnd1 or not; the POS terminal is used for encrypting the second random number Rnd2 by using the authentication key AUK to generate a second random number text Crnd2, and sending the second random number text Crnd2 to the KMS system when judging that the third random number Rnd1' is consistent with the first random number Rnd1; the KMS system is used for calling the second hardware and security module to decrypt the received second random number text Crnd2 by using the authentication key AUK so as to obtain a fourth random number Rnd2' and judging if the fourth random number Rnd' is consistent with the second random number Rnd2 or not; and the KMS system is used for confirming that the KMS system and the POS terminal pass the authentication when judging that the fourth random number Rnd' is consistent with the second random number Rnd2.

According to the key management method and the key management system of the present invention, the master key can be downloaded remotely, thus avoiding a situation where the POS terminal releases the master keys to the merchants after concentratedly downloading the master keys, and reducing logistic costs and maintenance costs. When downloading the keys remotely, the KMS system adopts the symmetric algorithm to encrypt the keys to be transmitted, ensuring that only the corresponding POS terminal can decrypt the encrypted keys and ensuring the security of data transmission. During bidirectional authentication, the application program of the POS terminal cannot touch the clear key required to be remotely downloaded into the POS terminal, and can only touch the text form of the key, thus ensuring security downloading. The solution combines non-symmetric algorithm and symmetric algorithm and reduces the complexity of the system.

DESCRIPTION OF THE MAIN COMPONENTS

Operating system 10; hardware and security module 20; POS terminal 30; MTMS system 40; KMS system 50; operator card 11.

DETAILED DESCRIPTION OF THE PRESENT INVENTION

The technical contents, structural characteristics, fulfilled objectives, and effects of the present invention are described in detail with reference to the embodiments and attached drawings.

The definitions of the abbreviations and key terms involved in the present invention are described first:

Symmetric key: both data sending and receiving parties must have identical keys to perform encryption and decryption algorithms on the clear text. Symmetric key encryption algorithms mainly include: DES, 3DES, IDEA, FEAL, BLOWFISH.

Non-symmetric keys: Non-symmetric encryption algorithms need two keys: a public key and private key. The public key and the private key are a pair. If the data is encrypted by using the public key, then the corresponding private key can implement the decryption; if the data is encrypted by the private key, then only the corresponding public key can implement the decryption. Two different keys are used to implement the encryption and decryption, so such algorithm is also called a non-symmetric encryption algorithm. The basic process where the non-symmetric encryption algorithm realizes exchange of the confidential information is as follows: Party A generates a pair of keys and discloses one of the keys as the public key to the other parties; Part B receives the public key and uses the key to encrypt the confidential information and then sends the encrypted information to Party A; Party B uses another exclusive key to decrypt the encrypted information. Party A can encrypt the confidential information by using the public key of Party B and then sends the encrypted information to Party B; then, Party B decrypts the encrypted information by using its own private key. Main algorithms include: RSA, Elgamal, knapsack algorithm, Rabin, D-H, ECC (Elliptic Curve Cryptography).

RSA: a non-symmetric key algorithm The RSA public key encryption algorithm was crated by Ron Rivest, Adi Shamirh, and Len Adleman (Massachusetts Institute of Technology). RSA is named after the names of the three inventors. RSA is the most powerful public key encryption algorithm at present. It can resist all known PIN attacks, and has been recommended as the encryption standard for public key data by the ISO. The RSA algorithm is based on a very simple fact of number theory: it is very easy to multiply two big prime numbers. The RSA algorithm is the first algorithm capable of being used for encryption and digital signing at the same time, easy to understand and operate. RSA is the public key algorithm mostly widely researched, experiencing various attacks over more than 30 years since it was put forward. Now, RSA has been gradually accepted and is generally known as the most optimal public key solution at present.

TDES Triple-DES: DES is a kind of symmetric encryption algorithm, and the key includes 8 bytes. TDES is a DES-based encryption algorithm, and its key includes 16 bytes or 24 bytes. TDES/3DES is the abbreviation of Triple DES (namely triple Data Encryption Standard). DES is the abbreviation of Data Encryption Standard. DES is a symmetric key encryption algorithm, which means that the data encryption algorithm and the data decryption algorithm are the same. DES was developed and disclosed by IBM in the 70s of the 20th century, then adopted by the US government, and acknowledged by the American National Standards Institute (ANSI). TDES/3DES is a mode of DES encryption algorithm, using three 64-bit keys to encrypt the data three times. It is a more secure transformation of DES.

Figure 1:
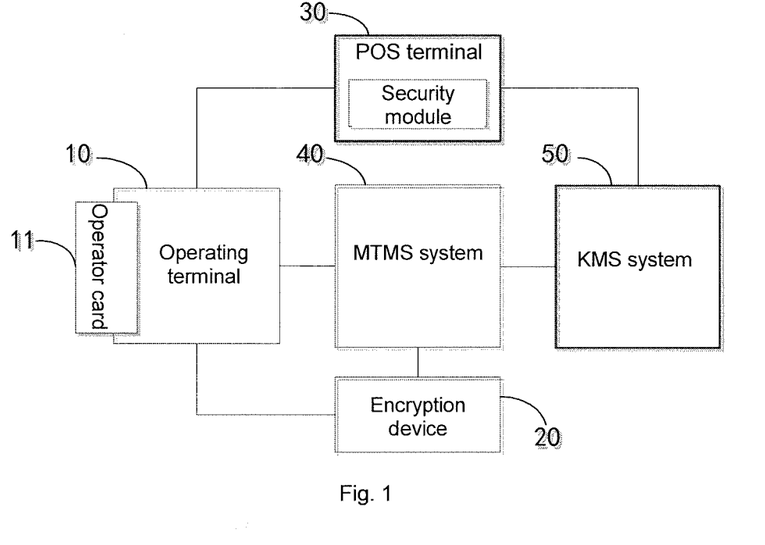
FIG. 1 is a structural diagram of a key management system in embodiment of the present invention.

FIG. 1 is a structural diagram of a key management system in embodiment 1 of the present invention. The key management system comprises an operating terminal 10, a first hardware and security module 20, a second hardware and security module 60, a POS terminal 30, an MTMS system 40, and a KMS system 50. The first hardware and security module 20 is used to allow calls by the MTMS system 40, while the second hardware and security module 60 is used for calling by the KMS system 50. The operating terminal 10 needs to be inserted with the operator card 11 and can only be used after the PIN of the operator card 11 is passed. The operator card 11 is used to identify the operator identification by entering the PIN so as to complete signing on the TK data package. The MTMS system 40 is a material tracking system, used to record information about the production devices during production in the plant. The KMS system is a key management system, located in the security room, responsible for generation and maintenance of keys such as the terminal master keys and working keys of the POS terminal. The KMS system is usually located at the place of the client.

The MTMS system 40 is used for calling the first hardware and security module 20 to generate the public key Pu and the private key Pr, storing the private key Pr in the first hardware and security module 20 and sending the public key Pu to the security module of the POS terminal 30, wherein the public-private key pair is generated only once on condition that the private key Pr is not leaked or damaged. Specifically, the MTMS system 40 is used for calling the first hardware and security module 20 to generate the public key Pu and the private key Pr, storing the private key Pr in the first hardware and security module 20, recording the index number of the private key Pr in the first hardware and security module 20 and sending the public key Pu to the CA center; the CA center is also called CA institute (namely Certificate Authority center or Certificate Authority Institute), with the functions of verification of the digital certificates, management of the certificates and keys, review and approval of the certificates, generation of the certificates, etc. The MTMS system 40 is also used to obtain the generated working certificate HsmWCRT from the CA center and store the working certificate in the database; the working certificate HsmWCRT is generated by signing the public key with the root certificate HsmRCRT. The operating system 10 is used to obtain the working certificate HsmWCRT from the database of the MTMS system 40, and send the working certificate HsmWCRT to the POS terminal 30; the POS terminal 30 is used to verify the validity of the working certificate HsmWCRT by using the root certificate HsmRCRT preloaded in the record, and used to extract the public key Pu after the verification is passed and store the public key Pu in the security module.

The MTMS system 40 is used for calling the first hardware and security module 20 and the KMS system 50 is used for calling the second hardware and security module 60 to respectively combine MTMS access components and KMS access components into a protective key PK and a MAC key MAK in the respective hardware and security module and store the protective key PK and the MAC key MAK in the first hardware and security module 20 and the second hardware and security module 60.

The operating terminal 10 is used to control the POS terminal 30 to generate a transmission key TK and store the transmission key in the security module of the POS terminal 30, wherein the transmission key TK consists of a transmission encryption key TEK and an authentication key AUK; the transmission encryption key TEK is a symmetric key for encrypted transmission between the POS terminal 30 and the KMS system 50, is encrypted and stored in the database of the KMS system 50; the authentication key AUK is a symmetric key for bidirectional authentication between the POS terminal 30 and the KMS system 50, encrypted and stored in the database of the KMS system.

The POS terminal 30 is used for encrypting the transmission key TK by using the public key Pu in the security module so as to generate the first transmission key cipher text Ctk_Pu, and sending the first transmission key cipher text Ctk_Pu and the terminal sequence number SN to the MTMS system 40 through the operating terminal. Specifically, the POS terminal 30 is used to send the first transmission key cipher text Ctk_Pu and the terminal sequence number SN to the operating terminal 10; the operating system 10 is used to package the received first transmission key cipher text Ctk_Pu and the terminal sequence number SN, sign with an operator card, and send the signed first transmission key cipher text Ctk_Pu and the terminal sequence number SN to the MTMS system 40; the MTMS system 40 is used to verify the validity of the signature, and if the signature is valid, connectedly store the terminal sequence number SN and the first transmission key cipher text Ctk_Pu in the SN-Key_MTMS database.

The MTMS system 40 is used to store the received terminal sequence number SN and the first transmission key cipher text Ctk_Pu connectedly in the SN-Key_MTMS database, and call the first hardware and security module 20 to decrypt the first transmission key cipher text Ctk_Pu by using the private key Pr so as to obtain the transmission key TK, then encrypt the transmission key TK by using the protective key PK and calculate the MAC value by using the MAC key MAK so as to generate the second transmission key cipher text Ctk_Pkm, and send the terminal sequence number SN and the second transmission key cipher text Ctk_Pk to the KMS system 40. The KMS system 50 is used to connectedly store the terminal sequence number SN and the second transmission key cipher text Ctk_pk sent by the MTMS system 40 into the SN-TK_KMS database.

The POS terminal 30 is used for sending the terminal sequence number SN and a downloading master key application to the KMS system 50; the KMS system 50 is used for inquiring about the second transmission key cipher text Ctk_Pk corresponding to the terminal sequence number SN after receiving the terminal sequence number and the downloading master key application sent by the POS terminal; the KMS system 50 is also used for calling the second hardware and security module 60 to verify the MAC validity of the inquired-about second transmission key cipher text Ctk_Pk by using the MAC key MAK, and if the verification is passed, decrypting the second transmission key cipher text Ctk_Pk by using the protective key PK to obtain the transmission key TK, and storing the transmission key in the second hardware and security module 60; the KMS system 50 is also used for calling the second hardware and security module 60 to perform bidirectional authentication by using the authentication key AUK and the POS terminal 30 after obtaining the transmission key TK, and if the authentication is passed, the KMS system 50 calls the second hardware and security module 60 to encrypt the terminal master key TMK by using the transmission decryption key TEK so as to generate the master key cipher text Ctmk, and sends the master key cipher text to the POS terminal 30; the POS terminal 30 is also used for decrypting the master key cipher text Ctmk by using the transmission encryption key TEK to obtain the terminal master key TMK and storing the terminal master key TMK in the security module after receiving the master key cipher text Ctmk sent by the KSM system 50.

Specifically, the bidirectional authentication process is as follows: the POS terminal 30 is used for generating a first random number Rnd1 and sending the first random number Rnd1 to the KMS system 50; the KMS system 50 is used for generating the second random number Rnd2 after receiving the first random number Rnd1, calling the second hardware and security module to encrypt the first random number by using the authentication key AUK so as to obtain a first random number text Crnd1, and sending the first random number text Crnd1 and the second random number Rnd2 to the POS terminal 30; the POS terminal 30 is used for decrypting the received first random number text Crnd1 by using the authentication key AUK to obtain a third random number Rnd1', and judging if the third random number Rnd1' is consistent with the first random number Rnd1 or not; when judging that the third random number Rnd1' is consistent with the first random number Rnd1, the POS terminal 30 is used for calling the second hardware and security module to encrypt the second random number Rnd2 by using the authentication key AUK to generate a second random number text Crnd2, and sending the second random number text Crnd2 to the KMS system; the KMS system 50 is used for decrypting the received second random number text Crnd2 by using the authentication key AUK so as to obtain a fourth random number Rnd2' and judging if the fourth random number Rnd' is consistent with the second random number Rnd2 or not; and when judging that the fourth random number Rnd' is consistent with the second random number Rnd2, the KMS system 50 is used for confirming that the KMS system 50 and the POS terminal 30 pass the authentication.

The POS terminal 30 is also used for decrypting the master key cipher text Ctmk by using the transmission encryption key TEK to obtain the terminal master key TMK after receiving the master key cipher text Ctmk sent by the KSM system 50 and storing the terminal master key TMK in the security module.

Figure 2:
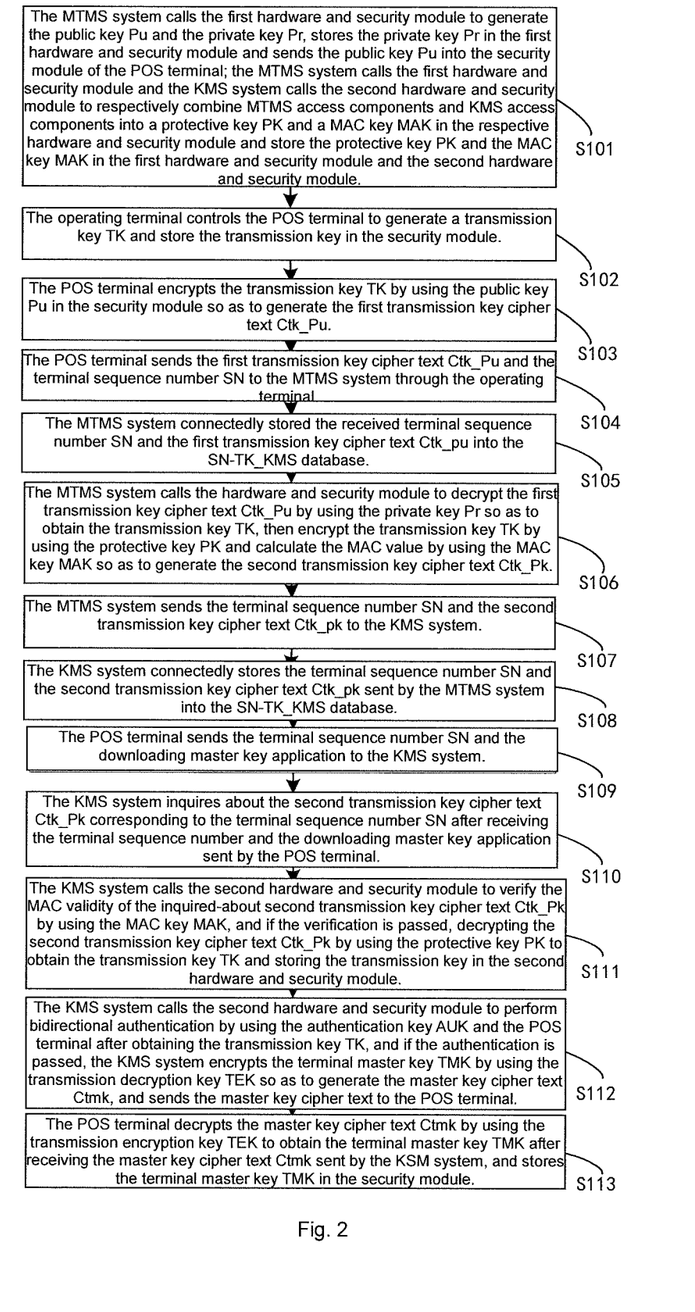
FIG. 2 is a flowchart of a key management method in embodiment 1 of the present invention.

Refer to FIG. 2, which is a flowchart of a key management method in embodiment of the present invention. The key downloading method operates in the key management system. The method is carried out as follows:

Step S101. The MTMS system calls the first hardware and security module to generate the public key Pu and the private key Pr, stores the private key Pr in the first hardware and security module and sends the public key Pu into the security module of the POS terminal; the MTMS system calls the first hardware and security module and the KMS system calls the second hardware and security module to respectively combine MTMS access components and KMS access components into a protective key PK and a MAC key MAK in the respective hardware and security module and store the protective key PK and the MAC key MAK in the first hardware and security module and the second hardware and security module.

Step 102. The operating terminal controls the POS terminal to generate a transmission key TK and store the transmission key in the security module of the POS terminal, wherein the transmission key TK consists of a transmission encryption key TEK and an authentication key AUK.

Step 103. The POS terminal encrypts the transmission key TK by using the public key Pu in the security module so as to generate the first transmission key cipher text Ctk_Pu.

Step S104. The POS terminal sends the first transmission key cipher text Ctk_Pu and the terminal sequence number SN to the MTMS system through the operating terminal.

Step S105. The MTMS system connectedly stores the received terminal sequence number SN and the first transmission key cipher text Ctk_pu into the SN-TK_KMS database.

Step S106. The MTMS system calls the hardware and security module to decrypt the first transmission key cipher text Ctk_Pu by using the private key Pr so as to obtain the transmission key TK, then encrypts the transmission key TK by using the protective key PK and calculates the MAC value by using the MAC key MAK so as to generate the second transmission key cipher text Ctk_Pk.

Step S107. The MTMS system sends the terminal sequence number SN and the second transmission key cipher text Ctk_pk to the KMS system.

Step S108: The KMS system connectedly stores the terminal sequence number SN and the second transmission key cipher text Ctk_pk sent by the MTMS system into the SN-TK_KMS database.

Step S109. The POS terminal sends the terminal sequence number SN and the downloading master key application to the KMS system.

Step S110. The KMS system inquires about the second transmission key cipher text Ctk_Pk corresponding to the terminal sequence number SN after receiving the terminal sequence number and the downloading master key application sent by the POS terminal.

Step S111. The KMS system calls the second hardware and security module to verify the MAC validity of the inquired-about second transmission key cipher text Ctk_Pk by using the MAC key MAK, and if the verification is passed, decrypting the second transmission key cipher text Ctk_Pk by using the protective key PK to obtain the transmission key TK, and storing the transmission key in the second hardware and security module.

Step S112. After obtaining the transmission key TK, the KMS system calls the second hardware and security module to perform bidirectional authentication by using the authentication key AUK and the POS terminal, and if the authentication is passed, the KMS system calls the second hardware and security module to encrypt the terminal master key TMK by using the transmission decryption key TEK so as to generate the master key cipher text Ctmk and send the master key cipher text to the POS terminal.

Step S113. The POS terminal decrypts the master key cipher text Ctmk by using the transmission encryption key TEK to obtain the terminal master key TMK after receiving the master key cipher text Ctmk sent by the KSM system and store the terminal master key TMK in the security module.

Wherein, the step of calling the first hardware and security module to generate the public key Pu and the private key Pr, storing the private key Pr in the first hardware and security module and sending the public key Pu to the security module of the POS terminal by the MTMS system specifically comprises:

Step S201. The MTMS system calls the first hardware and security module to generate the public key Pu and the private key Pr, stores the private key Pr in the first hardware and security module, records the index number of the private key Pr in the first hardware and security module and sends the public key Pu to the CA center.

Step S202. The CA center generates the working certificate HsmWCRT by using the root certificate HsmRCRT.

Step S203. The MTMS system obtains the generated working certificate HsmWCRT from the CA center and stores the working certificate in the database.

Step S204. The operating system obtains the working certificate HsmWCRT from the database of the MTMS system, and sends the working certificate HsmWCRT to the POS terminal.

Step S205. The POS terminal verifies the validity of the working certificate HsmWCRT by using the root certificate HsmRCRT preloaded in the record.

Step 206. After the verification is passed, the POS terminal extracts the public key Pu and stores the public key Pu in the security module.

The step of "sending the first transmission key cipher text Ctk_Pu and the terminal sequence number SN to the MTMS system through the operating terminal, via the POS terminal, and storing the received terminal sequence number SN and the first transmission key cipher text Ctk_Pu connectedly in the SN-Key_MTMS database, via the MTMS system" is carried out as follows:

Step S301. The POS terminal sends the first transmission key cipher text Ctk_Pu and the terminal sequence number SN to the operating terminal.

Step 302. The operating system packages the received first transmission key cipher text Ctk_Pu and the terminal sequence number SN, signs with the operator card, and sends the signed first transmission key cipher text Ctk_Pu and the terminal sequence number SN to the MTMS system.

Step S303. The MTMS system verifies the validity of the signature, and if the signature is valid, connectedly stores the received terminal sequence number SN and the first transmission key cipher text Ctk_pu into the SN-TK_KMS database.

Wherein, the step of "calling the second hardware and security module to perform bidirectional authentication by using the authentication key AUK and the POS terminal, via the KMS system after obtaining the transmission key TK" is carried out as follows:

S401. The POS terminal generates a first random number Rnd1 and sends the first random number Rnd1 to the KMS system.

S402. The KMS system generates the second random number Rnd2 after receiving the first random number Rnd1, calls the second hardware and security module to encrypt the first random number by using the authentication key AUK so as to obtain a first random number text Crnd1, and sends the first random number text Crnd1 and the second random number Rnd2 to the POS terminal.

S403. The POS terminal decrypts the received first random number text Crnd1 by using the authentication key AUK to obtain a third random number Rnd1', and judges if the third random number Rnd1' is consistent with the first random number Rnd1 or not.

S404. If the third random number Rnd1' is consistent with the first random number Rnd1, the POS terminal encrypts the second random number Rnd2 by using the authentication key AUK to generate a second random number text Crnd2, and sends the second random number text Crnd2 to the KMS system.

S405. The KMS system calls the second hardware and security module to decrypt the received second random number text Crnd2 by using the authentication key AUK so as to obtain a fourth random number Rnd2', and judges if the fourth random number Rnd' is consistent with the second random number Rnd2 or not; and if the fourth random number Rnd' is consistent with the second random number Rnd2, the KMS system and the POS terminal pass the authentication.

According to the key management method and the key management system of the present invention, the master key can be downloaded remotely, thus avoiding a situation where the POS terminal releases the master keys to the merchants after concentratedly downloading the master keys, and reducing logistics costs and maintenance costs. When downloading the keys remotely, the KMS system adopts the symmetric algorithm to encrypt the keys to be transmitted, ensuring that only the corresponding POS terminal can decrypt the encrypted keys and ensuring the security of data transmission. During bidirectional authentication, the application program of the POS terminal cannot touch the clear key required to be remotely downloaded into the POS terminal, and can only touch the text form of the key, thus ensuring security downloading. The solution combines non-symmetric algorithm and symmetric algorithm and reduces the complexity of the system. The transmission encryption key and the authentication key are used in this process, generated by the POS terminal. The text is transmitted into the KMS system through a non-symmetric algorithm or symmetric algorithm. The decryption proceeds in the hardware and security module, ensuring the security of the key.

The above are only some embodiments of the present invention and shall not be regarded as limits to the present invention. Any equivalent structure or equivalent flow modifications made on the basis of the description and attached drawings of the present invention, or direct or indirect application to other related fields, shall fall within the protective scope of the present invention.

What is claimed is:

1. A key management method, comprising:

calling a first hardware and security module to generate a public key Pu and a private key Pr, storing the private key Pr in the first hardware and security module and sending the public key Pu to a security module of the POS terminal, using a Material Tracking and Management (MTMS) system;

calling the first hardware and security module using the MTMS system and calling a second hardware and security module using a KMS system to respectively combine MTMS access components and KMS access components into a protective key PK and a MAC key MAK in the respective first and second hardware and security modules and store the protective key PK and the MAC key MAK in the respective first hardware and security module and the second hardware and security module;

using an operating terminal to generate a transmission key TK and store the transmission key in the security module of the POS terminal, wherein the transmission key TK consists of a transmission encryption key TEK and an authentication key AUK;

encrypting the transmission key TK using the public key Pu to generate a first transmission key cipher text Ctk_Pu in the security module of the POS terminal using the POS terminal;

sending the first transmission key cipher text Ctk_Pu and a terminal sequence number SN to the MTMS system through the operating terminal using the POS terminal;

storing the received terminal sequence number SN and the corresponding first transmission key cipher text Ctk_Pu in an SN-Key_MTMS database using the MTMS system;

calling the first hardware and security module to decrypt the first transmission key cipher text Ctk_Pu using the private key Pr to obtain the transmission key TK, encrypting the transmission key TK using the protective key PK and calculating a MAC value using the MAC key MAK to generate a second transmission key cipher text Ctk_Pk using the MTMS system;

sending the terminal sequence number SN and the second transmission key cipher text Ctk_Pk to the KMS system using the MTMS system;

storing the terminal sequence number SN and the second transmission key cipher text Ctk_Pk sent from the MTMS system in an SN-TK_KMS database using the KMS system;

sending the terminal sequence number SN and a downloading master key application to the KMS system using the POS terminal;

inquiring about the second transmission key cipher text Ctk_Pk corresponding to the terminal sequence number SN using the KMS system after receiving the terminal sequence number SN and the downloading master key application sent by the POS terminal;

calling the second hardware and security module to verify the MAC validity of the inquired-about second transmission key cipher text Ctk_Pk using the MAC key MAK, and if the verification is passed, decrypting the second transmission key cipher text Ctk_Pk using the protective key PK to obtain the transmission key TK, and storing the transmission key TK in the second hardware and security module, using the KMS system;

calling the second hardware and security module to perform bidirectional authentication using an authentication key AUK and the POS terminal by the KMS system after obtaining the transmission key TK, and if the authentication is passed, calling the second hardware and security module to encrypt the terminal master key TMK using the transmission decryption key TEK to generate a master key cipher text Ctmk, and sending the master key cipher text Ctmk to the POS terminal, using the KMS system;

decrypting the master key cipher text Ctmk using the transmission encryption key TEK to obtain the terminal master key TMK and storing the terminal master key TMK in the security module of the POS terminal, using the POS terminal after receiving the master key cipher text Ctmk sent by the KSM system.

2. The key management method according to claim 1, wherein the calling the first hardware and security module of the POS terminal to generate the public key Pu and the private key Pr, storing the private key Pr in the first hardware and security module and sending the public key Pu to the security module of the POS terminal, via the MTMS system comprises:

calling the first hardware and security module to generate the public key Pu and the private key Pr, storing the private key Pr in the first hardware and security module, recording an index number of the private key Pr in the first hardware and security module and sending the public key Pu to a CA center, via the MTMS system;

obtaining a generated working certificate HsmWCRT from the CA center and storing the working certificate in the SN-Key_MTMS database via the MTMS system, wherein the working certificate HsmWCRT is generated by signing the public key with a root certificate HsmRCRT;

obtaining a working certificate HsmWCRT from the SN-KEY_MTMS database of the MTMS system, and sending the working certificate HsmWCRT to the POS terminal, via an operating system;

verifying a validity of the working certificate HsmWCRT using a root certificate HsmRCRT preloaded in a record, by the POS terminal;

after the verification is passed, extracting the public key Pu and storing the public key Pu in the security module of the POS terminal, using the POS terminal.

3. The key management method according to claim 2, wherein the sending the first transmission key cipher text Ctk_Pu and the terminal sequence number SN to the MTMS system through the operating terminal by the POS terminal, and the storing the received terminal sequence number SN and the first transmission key cipher text Ctk_Pu in the SN-Key_MTMS database via the MTMS system comprises:

sending the first transmission key cipher text Ctk_Pu and the terminal sequence number SN to the operating terminal, via the POS terminal;

packaging the received first transmission key cipher text Ctk_Pu and the terminal sequence number SN, signing the first transmission key cipher text Ctk_Pu and the terminal sequence number SN with an operator card, and sending the signed first transmission key cipher text Ctk_Pu and the terminal sequence number SN to the MTMS system via the operating system;

verifying a validity of a signature, and if the signature is valid, storing the received terminal sequence number SN and the first transmission key cipher text Ctk_pu into the SN-TK_KMS database, via the MTMS system.

4. The key management method according to claim 3, further comprising extracting the terminal sequence number SN and the first transmission key cipher text Ctk_Pu to be sent from the SN-Key_MTMS database, verifying the validity of the signature, and if the signature is valid, executing the calling the first hardware and security module to decrypt the first transmission key cipher text Ctk_Pu using the private key Pr to obtain the transmission key TK, via the MTMS system.

5. The key management method according to claim 3, wherein the after obtaining the transmission key TK, calling the second hardware and security module to perform bidirectional authentication using the authentication key AUK and the POS terminal, using the KMS system comprises:

generating a first random number Rnd1 and sending the first random number Rnd1 to the KMS system using the POS terminal;

generating a second random number Rnd2, calling the second hardware and security module to encrypt the first random number using the authentication key AUK to obtain a first random number text Crnd1, and sending the first random number text Crnd1 and the second random number Rnd2 to the POS terminal using the KMS system after receiving the first random number Rnd1;

decrypting the received first random number text Crnd1 using the authentication key AUK to obtain a third random number Rnd1', and judging if the third random number Rnd1' is consistent with the first random number Rnd1 or not, using the POS terminal;

if the third random number Rnd1' is consistent with the first random number Rnd1, encrypting the second random number Rnd2 using the authentication key AUK to generate a second random number text Crnd2, and sending the second random number text Crnd2 to the KMS system using the POS terminal;

decrypting the received second random number text Crnd2 using the authentication key AUK to obtain a fourth random number Rnd2', and judging if the fourth random number Rnd' is consistent with the second random number Rnd2 or not, via the KMS system;

and if the fourth random number Rnd' is consistent with the second random number Rnd2, confirming the KMS system and the POS terminal pass the authentication.

6. A key management system, comprising a first hardware and security module, a second hardware and security module, an operating terminal, a POS terminal, a Material Tracking and Management (MTMS) system and a KMS system; the first hardware and security module used to allow calls using the MTMS system, and the second hardware and security module used to allow calls using the KMS system; wherein,  the MTMS is used for calling the first hardware and security module to generate a public key Pu and a private key Pr, storing the private key Pr in the first hardware and security module and sending the public key Pu to a security module of the POS terminal;

the MTMS system is used for calling the first hardware and security module and the KMS system is used for calling the second hardware and security module to respectively combine MTMS access components and KMS access components into a protective key PK and a MAC key MAK in the respective first and second hardware and security modules and store the protective key PK and the MAC key MAK in the respective first hardware and security module and the second hardware and security module;

the operating system is used for controlling the POS terminal to generate a transmission key TK and store the transmission key in the security module of the POS terminal, wherein the transmission key TK consists of a transmission encryption key TEK and an authentication key AUK;

the POS terminal is used for encrypting the transmission key TK by using the public key Pu in the security module of the POS terminal so as to generate a first transmission key cipher text Ctk_Pu, and sending the first transmission key cipher text Ctk_Pu and a terminal sequence number SN to the MTMS system through the operating terminal;

the MTMS system is used for storing the received terminal sequence number SN and the corresponding first transmission key cipher text Ctk_Pu in an SN-Key_MTMS database, and calling the first hardware and security module to decrypt the first transmission key cipher text Ctk_Pu by-using the private key Pr so as to obtain the transmission key TK, then encrypting the transmission key TK by using the protective key PK and calculating a MAC value using the MAC key MAK so as to generate a second transmission key cipher text Ctk_Pk, and sending the terminal sequence number SN and the second transmission key cipher text Ctk_Pk to the KMS system;

the KMS system is used to store the terminal sequence number SN and the corresponding second transmission key cipher text Ctk_pk sent by the MTMS system into an SN-TK_KMS database;

the POS terminal is used to send the terminal sequence number SN and a downloading master key application to the KMS system;

the KMS system is used to inquire about the second transmission key cipher text Ctk_Pk corresponding to the terminal sequence number SN after receiving the terminal sequence number SN and the downloading master key application sent by the POS terminal;

the KMS system is used to inquire about the second hardware and security module to verify a MAC validity of the inquired-about second transmission key cipher text Ctk_Pk by using the MAC key MAK, and if the verification is passed, decrypts the second transmission key cipher text Ctk_Pk using the protective key PK to obtain the transmission key TK, and store the transmission key in the second hardware and security module;

the KMS system is used for calling the second hardware and security module to perform bidirectional authentication by using the authentication key AUK and the POS terminal, and if the authentication is passed, the KMS system calls the second hardware and security module to encrypt a terminal master key TMK using the transmission decryption key TEK so as to generate a master key cipher text Ctmk and send the master key cipher text Ctmk to the POS terminal;

the POS terminal is used for decrypting the master key cipher text Ctmk using the transmission encryption key TEK to obtain the terminal master key TMK after receiving the master key cipher text Ctmk sent by the KSM system, and storing the terminal master key TMK in the security module of the POS terminal.

7. The key management system according claim 6, wherein the MTMS system is used for calling the first hardware and security module to generate the public key Pu and the private key Pr, storing the private key Pr in the first hardware and security module, recording an index number of the private key Pr in the first hardware and security module and sending the public key Pu to a CA center using the MTMS system;

the MTMS system is also used to obtain a generated working certificate HsmWCRT from the CA center and store the working certificate HsmWCRT in the SN-key_MTMS database; the working certificate HsmWCRT is generated by signing the public key PU with a root certificate HsmRCRT;

the operating system is used to obtain the working certificate HsmWCRT from the SN-Key_MTMS database of the MTMS system, and send the working certificate HsmWCRT to the POS terminal;

the POS terminal is used to verify a validity of the working certificate HsmWCRT by using a root certificate HsmRCRT preloaded in a record, and used to extract the public key Pu after the verification is passed and store the public key Pu in the security module of the POS terminal.

8. The key management system according to claim 7, wherein:

the POS terminal is used to send the first transmission key cipher text Ctk_Pu and the terminal sequence number SN to the operating terminal;

the operating system packages the received first transmission key cipher text Ctk_Pu and the terminal sequence number SN, signs the first transmission key cipher text Ctk_Pu and the terminal sequence number SN with the operator card, and sends the signed first transmission key cipher text Ctk_Pu and the terminal sequence number SN to the MTMS system;

the MTMS system is used to verify a validity of a signature, and if the signature is valid, stores the received terminal sequence number SN and the corresponding first transmission key cipher text Ctk_pu into the SN-TK_KMS database.

9. The key management system according to claim 8, wherein:

the MTMS system is used for extracting the terminal sequence number SN and the first transmission key cipher text Ctk_Pu to be sent from the SN-Key_MTMS database, verifying the validity of the signature, and if the signature is valid, executing the step of calling the first hardware and security module using the MTMS system to decrypt the first transmission key cipher text Ctk_Pu by using the private key Pr so as to obtain the transmission key TK.

10. The key management system according to claim 8, wherein:
   the POS terminal is used for generating a first random number Rnd1 and sending the first random number Rnd1 to the KMS system;
   the KMS system is used for generating a second random number Rnd2 receiving the first random number Rnd1, calling the second hardware and security module to encrypt the first random number by using the authentication key AUK so as to obtain a first random number text Crnd1, and sending the first random number text Crnd1 and the second random number Rnd2 to the POS terminal;
   the POS terminal is used for decrypting the received first random number text Crnd1 using the authentication key AUK to obtain a third random number Rnd1', and judging if the third random number Rnd1' is consistent with the first random number Rnd1 or not;
   the POS terminal is used for encrypting the second random number Rnd2 using the authentication key AUK to generate a second random number text Crnd2, and sending the second random number text Crnd2 to the KMS system, when judging that the third random number Rnd1' is consistent with the first random number Rnd1;
   the KMS system is used for decrypting the received second random number text Crnd2 using the authentication key AUK so as to obtain a fourth random number Rnd2', and judging if the fourth random number Rnd' is consistent with the second random number Rnd2 or not;
   and the KMS system is used for confirming that the KMS system and the POS terminal pass the authentication when judging that the fourth random number Rnd' is consistent with the second random number Rnd2.

* * * * *